US012398650B1

(12) United States Patent
Desgagne et al.

(10) Patent No.: US 12,398,650 B1
(45) Date of Patent: Aug. 26, 2025

(54) TOOLING AND METHOD FOR ASSEMBLING A VANE RING

(71) Applicant: PRATT & WHITNEY CANADA CORP., Longueuil (CA)

(72) Inventors: Maxime Desgagne, Longueuil (CA); Frederic Labrie, St-Jude (CA); Gabriel Cyr-Carrier, Montreal (CA); Alexandre Lupien, Ste-Julie (CA); Robert Lavallee, Otterburn Park (CA); Pierre-Luc Lachance, Brossard (CA); Xavier Lemieux Sutton, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/788,382

(22) Filed: Jul. 30, 2024

(51) Int. Cl.
| | |
|---|---|
| B23P 11/02 | (2006.01) |
| B23P 19/027 | (2006.01) |
| F01D 9/04 | (2006.01) |

(52) U.S. Cl.
CPC ............ F01D 9/042 (2013.01); B23P 11/025 (2013.01); B23P 19/027 (2013.01); F05D 2230/60 (2013.01)

(58) Field of Classification Search
CPC ......... Y10T 29/49863; Y10T 29/49865; Y10T 29/53796; Y10T 29/53843; Y10T 29/37; Y10T 29/49316; Y10T 29/4932; Y10T 29/49321; F01D 9/042; B23P 11/025; B23P 19/027; B23P 15/00; F05D 2230/60

USPC ...... 29/446, 447, 23.51, 889, 889.2, 889.21, 29/282, 244

See application file for complete search history.

(56) References Cited

U.S. PATENT DOCUMENTS

| | | | | |
|---|---|---|---|---|
| 5,713,233 | A * | 2/1998 | McCarthy | B25H 1/0007 72/18.3 |
| 8,408,446 | B1 * | 4/2013 | Smoke | B23P 15/006 228/245 |
| 8,696,311 | B2 | 4/2014 | Eleftheriou et al. | |
| 9,835,171 | B2 | 12/2017 | Kimmel et al. | |
| 11,141,766 | B2 | 10/2021 | Cerovsky | |
| 11,519,280 | B1 | 12/2022 | Bainbridge et al. | |
| 12,000,293 | B1 | 6/2024 | Humes et al. | |
| 2010/0101065 | A1 * | 4/2010 | Macchia | F04D 7/065 29/259 |
| 2011/0041313 | A1 * | 2/2011 | James | F01D 9/044 29/505 |
| 2016/0201505 | A1 * | 7/2016 | Clarkson | F02C 7/20 415/200 |
| 2023/0392513 | A1 | 12/2023 | Rauschmeier | |

* cited by examiner

*Primary Examiner* — Sarang Afzali
*Assistant Examiner* — Darrell C Ford
(74) *Attorney, Agent, or Firm* — Norton Rose Fulbright Canada LLP

(57) ABSTRACT

Tooling and methods for assembling a vane ring of a turbine engine are provided. A tool includes a base configured to receive an outer ring and vanes radially inwardly of the outer ring. A heater is operable to apply heat to the outer ring when the outer ring is received on the base. Expandable jaws having a plurality of radially actuatable pads are operable to urge the vanes radially outwardly toward the outer ring. A press is operable to apply an axial force against an inner support of the vane ring to install the inner support radially inwardly of the vanes.

13 Claims, 16 Drawing Sheets

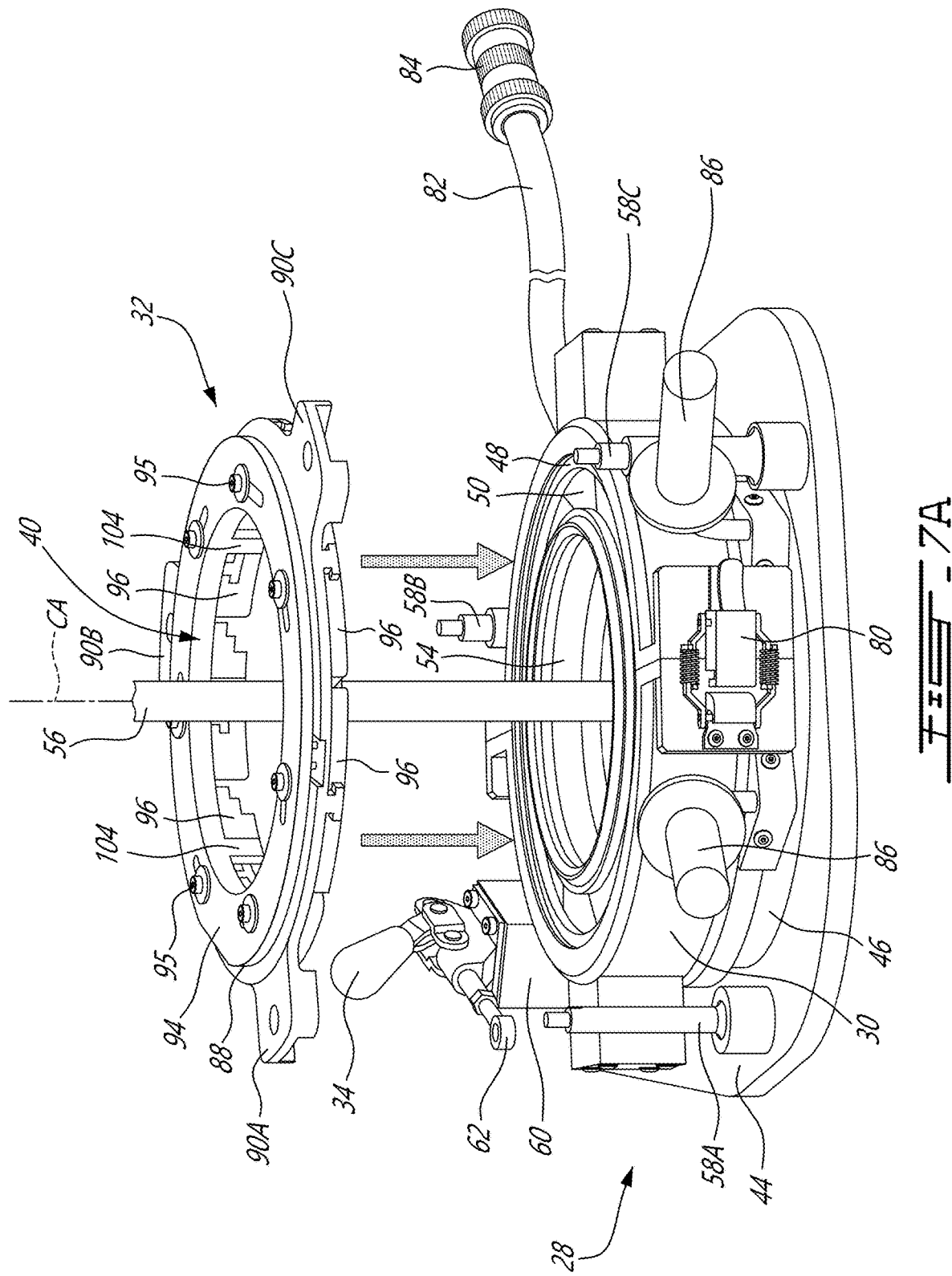

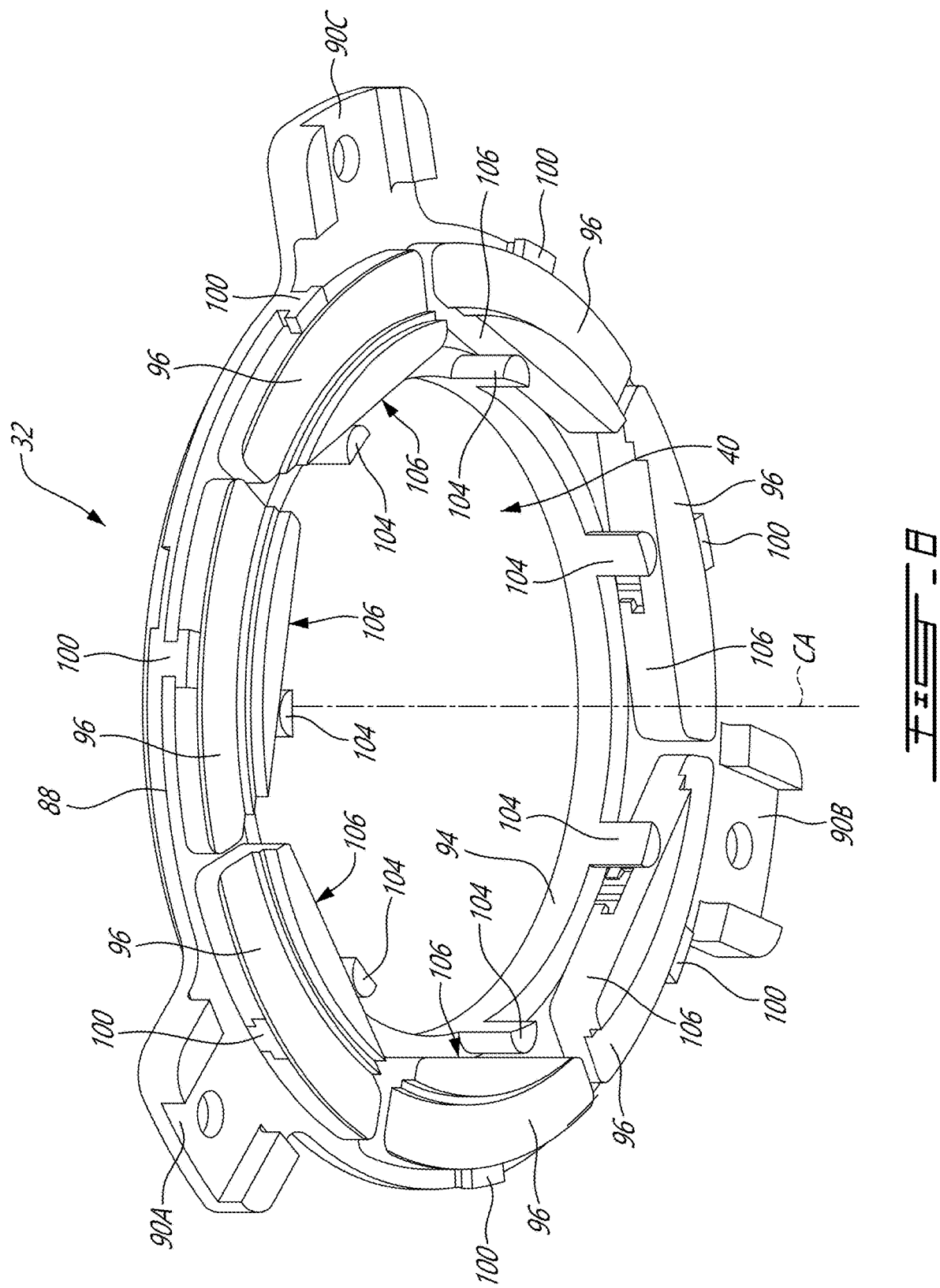

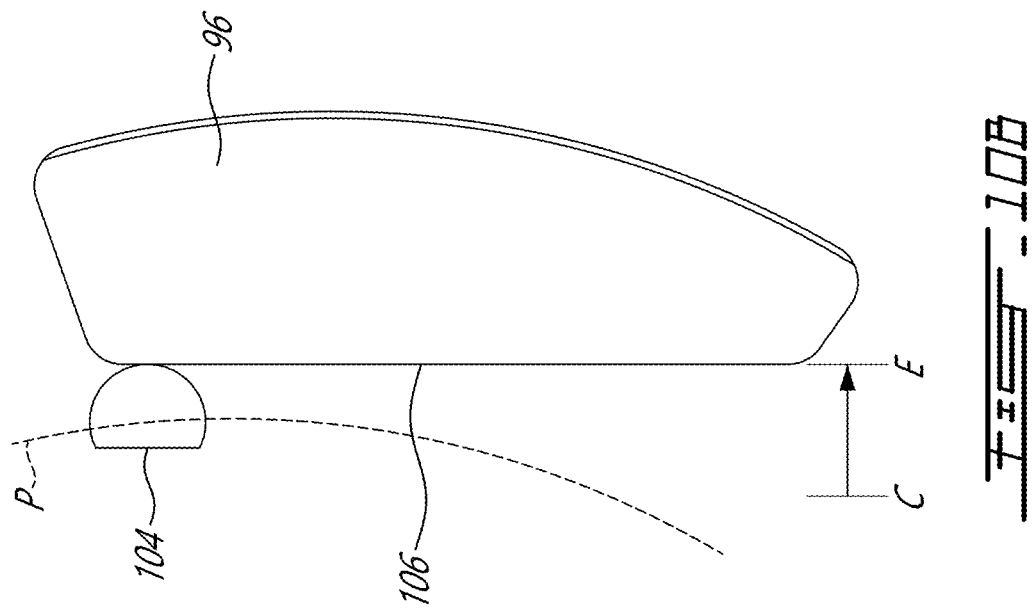
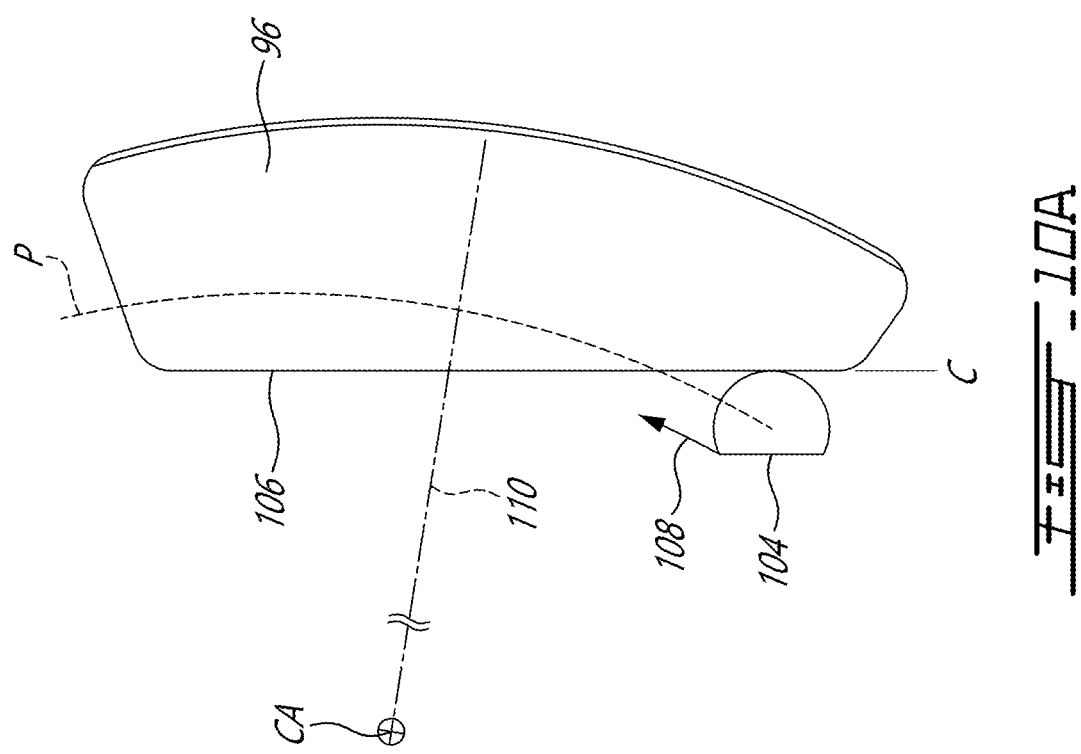

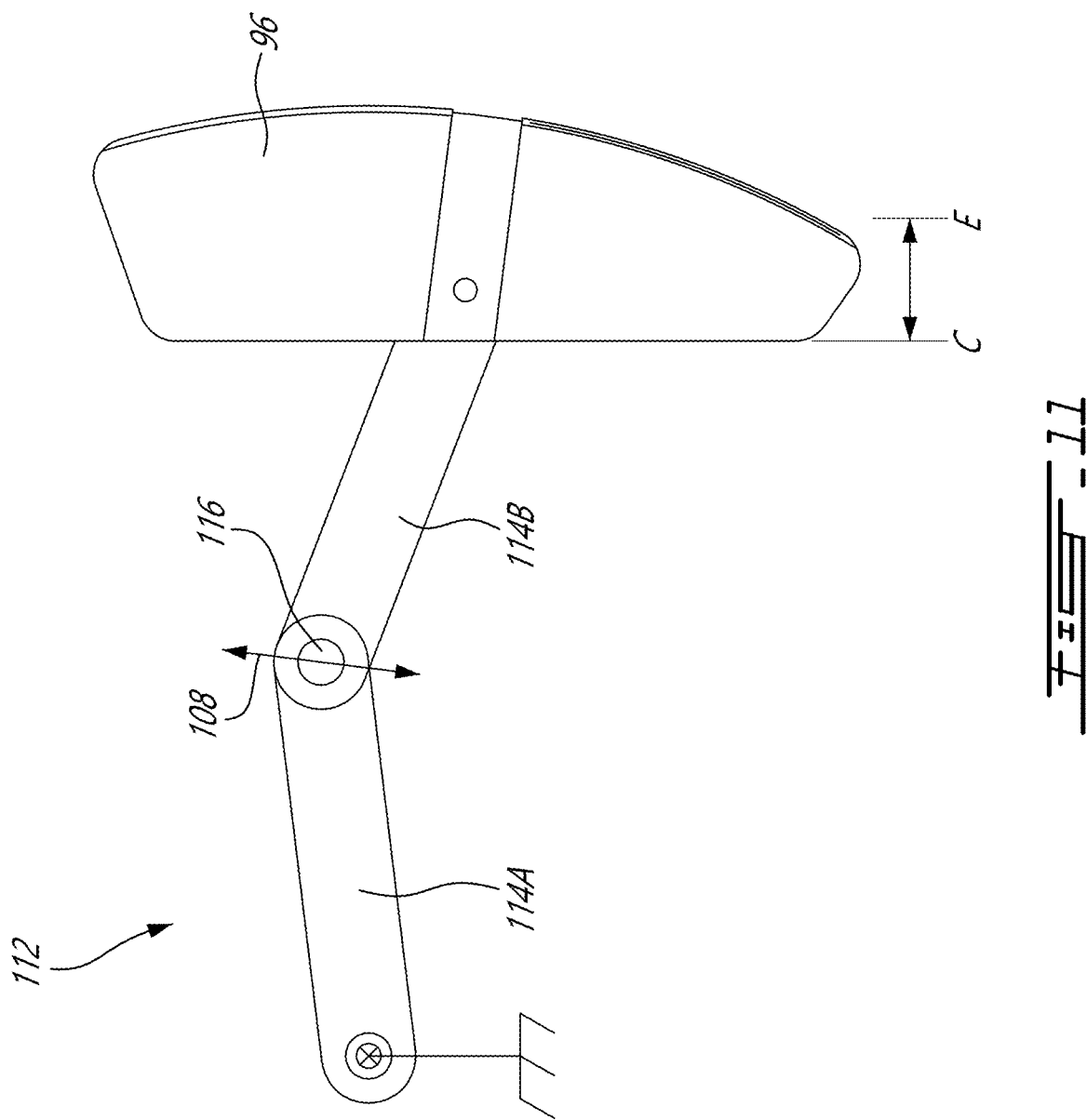

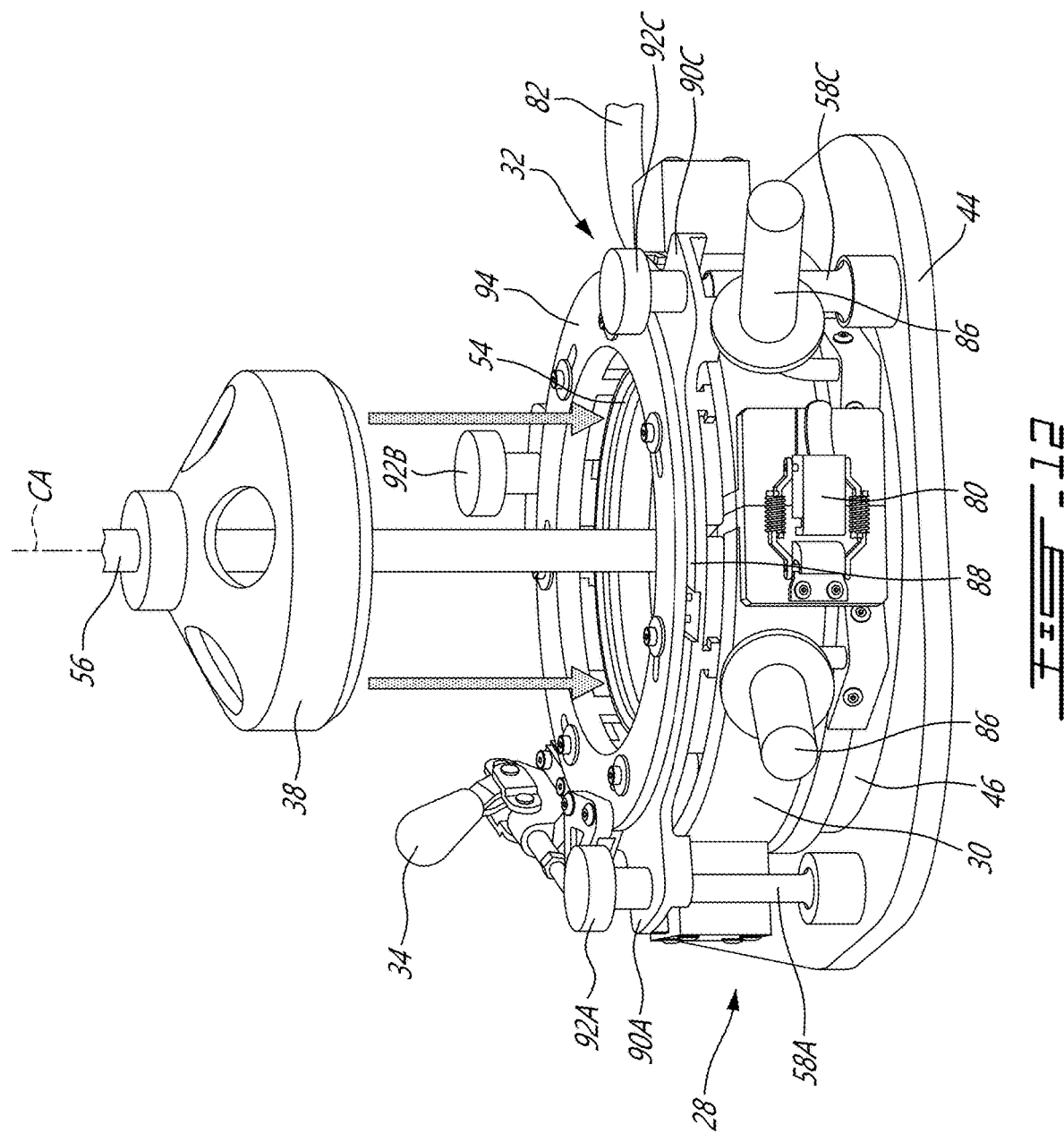

TOOLING AND METHOD FOR ASSEMBLING A VANE RING

TECHNICAL FIELD

The disclosure relates generally to assembling press-fitted components, and more particularly to tooling and method for assembling vane assemblies of turbine engines.

BACKGROUND

Some structures of turbine engines are assembled using press fits. For press-fitted assemblies that have several components, existing assembly procedures can be expensive, time consuming and must be executed carefully to obtain the desired result and avoid damaging any of the components. Improvement is desired.

SUMMARY

In one aspect, the disclosure describes a tool for assembling a vane ring including an outer ring, an inner support and a plurality of vanes disposed radially between the outer ring and the inner support. The tool comprises:
   a base configured to receive the outer ring and the vanes radially inwardly of the outer ring and angularly distributed about an axis;
   a heater operable to apply heat to the outer ring when the outer ring is received on the base;
   jaws having a plurality of radially actuatable pads operable to urge the vanes radially outwardly toward the outer ring; and
   a press operable to apply an axial force against the inner support to install the inner support radially inwardly of the vanes.

The base may include a receptacle configured to receive a boss on a vane segment including one or more of the vanes to angularly locate the vane segment on the base.

The receptacle may include a slot extending axially relative to the axis and having an open axial end for receiving the boss therein when the vane segment is received on the base by an axial movement of the vane segment relative to the base.

The base may include a locating feature configured to interact with the inner support to angularly locate the inner support on the base.

The heater may be configured apply heat to the outer ring by conductive heat transfer. The heater may extend along a majority of a circumference of the outer ring.

The press may include a drift defining an annular interface for applying the axial force against the inner support. The jaws may define a central opening that is sized to permit a passage of the drift therethrough.

The pads may be angularly distributed about the central opening of the jaws.

The jaws may include: a first ring configured to be secured to the base; and a second ring coaxial with the first ring and rotatable about the axis when the first ring is secured to the base. The second ring may be operatively connected to the pads to actuate the pads.

The tool may comprise a plurality of cams connected to the second ring of the jaws and rotatable with the second ring. The cams may be respectively engaged with follower surfaces of the pads to convert rotary motion of the cams into radially outward motion of the pads.

The tool may comprise a cam connected to the second ring of the jaws and rotatable with the second ring. The cam may be engaged with a follower surface of a first of the pads to convert rotary motion of the cam into radial motion of the first pad.

The cam may be located radially inwardly of the first pad.

The first pad may be engaged with the first ring via a guide extending radially relative to the axis.

The guide may include a rail secured to the first ring. The guide may be slidably received in a slot defined in the first pad.

Embodiments may include combinations of the above features.

In another aspect, the disclosure describes jaws for urging vanes radially outwardly toward an outer ring during assembly of a vane ring. The jaws comprise:
   a stationary ring configured to be secured to a base, the stationary ring having a central axis extending therethrough;
   a movable ring movably mounted to the stationary ring and being rotatable relative to the stationary ring about the central axis; and
   a plurality of radially movable pads, the pads being operatively connected to the movable ring and actuatable by movement of the movable ring relative to the stationary ring.

The jaws may comprise a plurality of cams connected to the movable ring and rotatable with the movable ring about the axis. Each of the cams may be engaged with a follower surface of one of the pads to convert rotary motion of the movable ring into radial motion of the pads.

The stationary ring may be disposed axially between the movable ring and the pads. The cams may be connected to the movable ring via a central opening of the stationary ring.

The jaws may comprise a plurality of rails secured to the stationary ring and extending radially. The rails may be angularly spaced apart around the stationary ring. The pads may each include a slot formed therein for engagement with a respective one of the rails.

Embodiments may include combinations of the above features.

In a further aspect, the disclosure describes a method of assembling a vane ring of a turbine engine. The method comprises:
   receiving an outer ring and a plurality of vane segments of the vane ring on a tooling base, the vane segments being disposed radially inwardly of the outer ring;
   heating the outer ring;
   while the outer ring is being heated:
   urging the vane segments radially outwardly toward the outer ring;
   partially receiving an inner support of the vane ring radially inwardly of the vane segments; and
   after urging the vane segments radially outwardly toward the outer ring, applying an axial force against the inner support to install the inner support radially inwardly of the vane segments and establish a press fit between the outer ring, the vane segments and the inner support.

The inner support may have a seal installed thereon and extending around the inner support. Applying an axial force against the inner support may include radially compressing the seal between the inner support and the vane segments.

The seal may be a first seal. The method may include: receiving a second seal between the vane segments and the outer ring; and radially compressing the second seal between the vane segments and the outer ring.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIG. 7A is a perspective view showing jaws being installed onto the base of the tool;

FIG. 8 is a perspective view of the jaws showing movable pads of the jaws;

FIGS. 10A and 10B are schematic top plan views of one of the pads of the jaws actuatable using a cam and shown in a contracted configuration of the jaws and in a expanded configuration of the jaws respectively;

FIG. 11 is a schematic top plan view of one of the pads of the jaws actuatable using a linkage;

FIG. 12 is a perspective view of a drift being passed through the jaws to access an inner support of the vane ring;

DETAILED DESCRIPTION

This disclosure describes tooling and associated methods for facilitating the assembly of vane rings for turbine engines. In some embodiments, the tools and methods described herein may facilitate the assembly of vane rings that include a plurality of components that are press-fitted together. In some embodiments, the tools and methods described herein may promote ease of use and reduce the risk of damaging the components of the vane ring during assembly. For example, the tools and methods described herein may promote desirable relative positioning of the components of the vane ring when the components are press-fitted together. Aspects of various embodiments are described through reference to the drawings.

The terms "connected" and "secured" may include both direct connection and securement (in which two components contact each other) and indirect connection and securement (in which at least one additional component is located between the two components). The term "coaxial" as used herein is intended to encompass geometric deviations (e.g., within intended dimensional tolerances) that do not result in a change in the basic function to which it is related. As used herein, the singular forms "a," "an," and "the" are intended to include the plural forms as well, unless the context clearly indicates otherwise.

Figure 1:
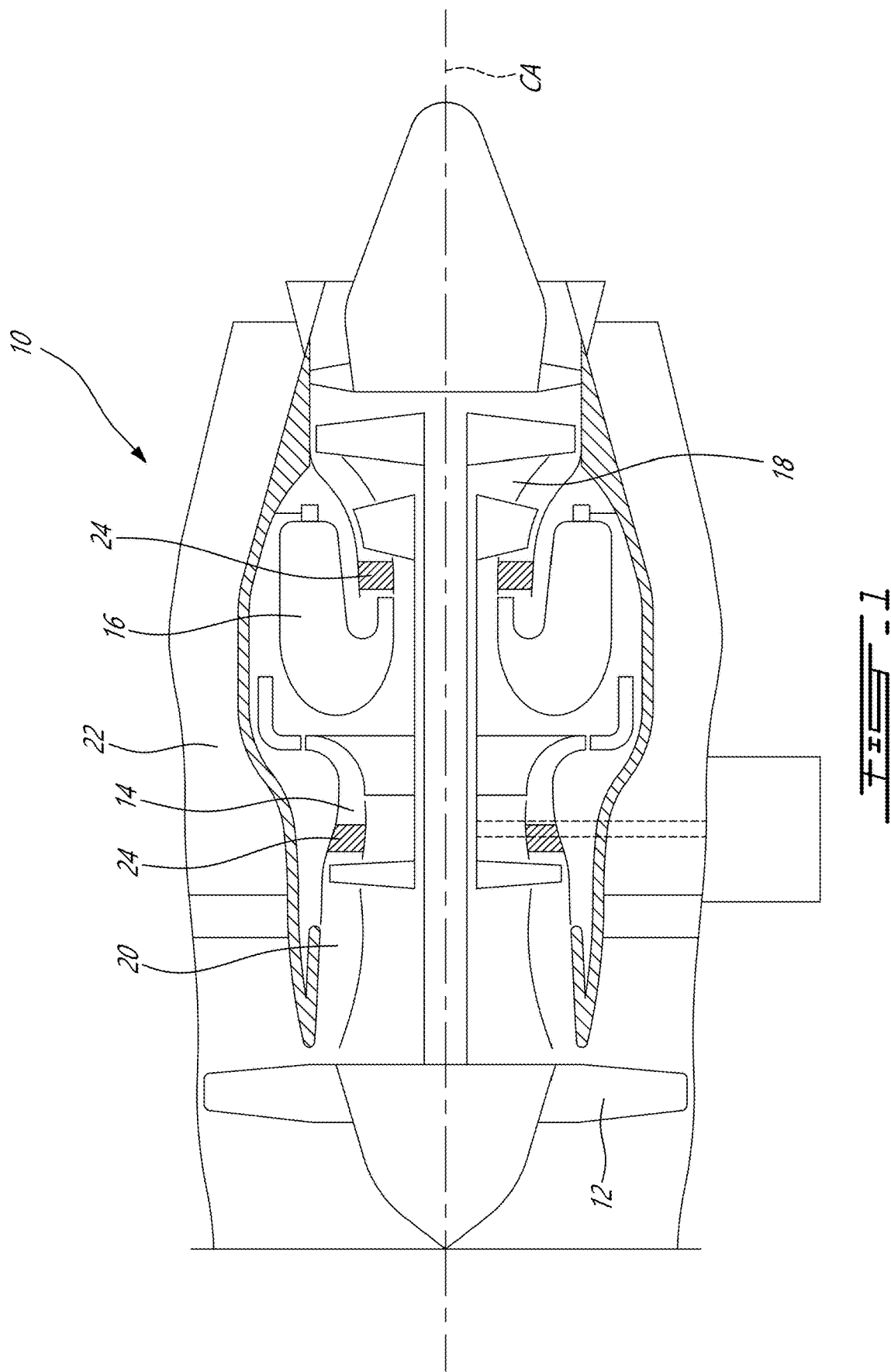
FIG. 1 shows an axial cross-section view of an exemplary turbine engine including a vane ring.

FIG. 1 illustrates an exemplary (e.g., gas) turbine engine 10 (referred hereinafter as "engine 10") of a type preferably provided for propelling an aircraft in subsonic flight. Engine 10 as illustrated in FIG. 1 is a turbofan engine but engine 10 may alternatively be a turboprop engine or a turboshaft engine. In some embodiments, engine 10 may be an auxiliary power unit that is used onboard an aircraft for functions other than propulsion. In some embodiments, engine 10 may be of a type suitable for ground-based (e.g., industrial) applications.

Engine 10 may include, in serial flow communication, fan 12 through which ambient air is propelled, multistage compressor 14 for pressurizing the air, combustor 16 in which the compressed air is mixed with fuel and ignited for generating an annular stream of hot combustion gases, and turbine section 18 for extracting energy from the combustion gases. Compressor 14, combustor 16 and turbine section 18 may be in serial fluid communication via core gas path 20 of engine 10. Core gas path 20 may be disposed radially inward of bypass duct 22 of engine 10.

Engine 10 may include one or more vane rings 24 (referred hereinafter in the singular) for directing a flow of gas (e.g., air, combustion gas) through core gas path 20 of engine 10. Vane ring 24 may include a plurality of fixed-orientation (i.e., non-variable) stator guide vanes that are angularly distributed about central axis CA and that are stationary within core gas path 20. Central axis CA may correspond to an axis of rotation of a rotor of compressor 14 and/or an axis of rotation of a rotor of turbine section 18. In some embodiments of engine 10, vane ring 24 may be installed upstream of combustor 16 and within compressor 14 to guide compressed air for example. In some embodiments of engine 10, vane ring 24 may be installed downstream of combustor 16 and within turbine section 18 to guide combustion gas for example. Vane ring 24 may be made from one or more suitable (e.g., metallic) material such as (e.g., stainless) steel or a nickel-based alloy for example.

Figure 2:
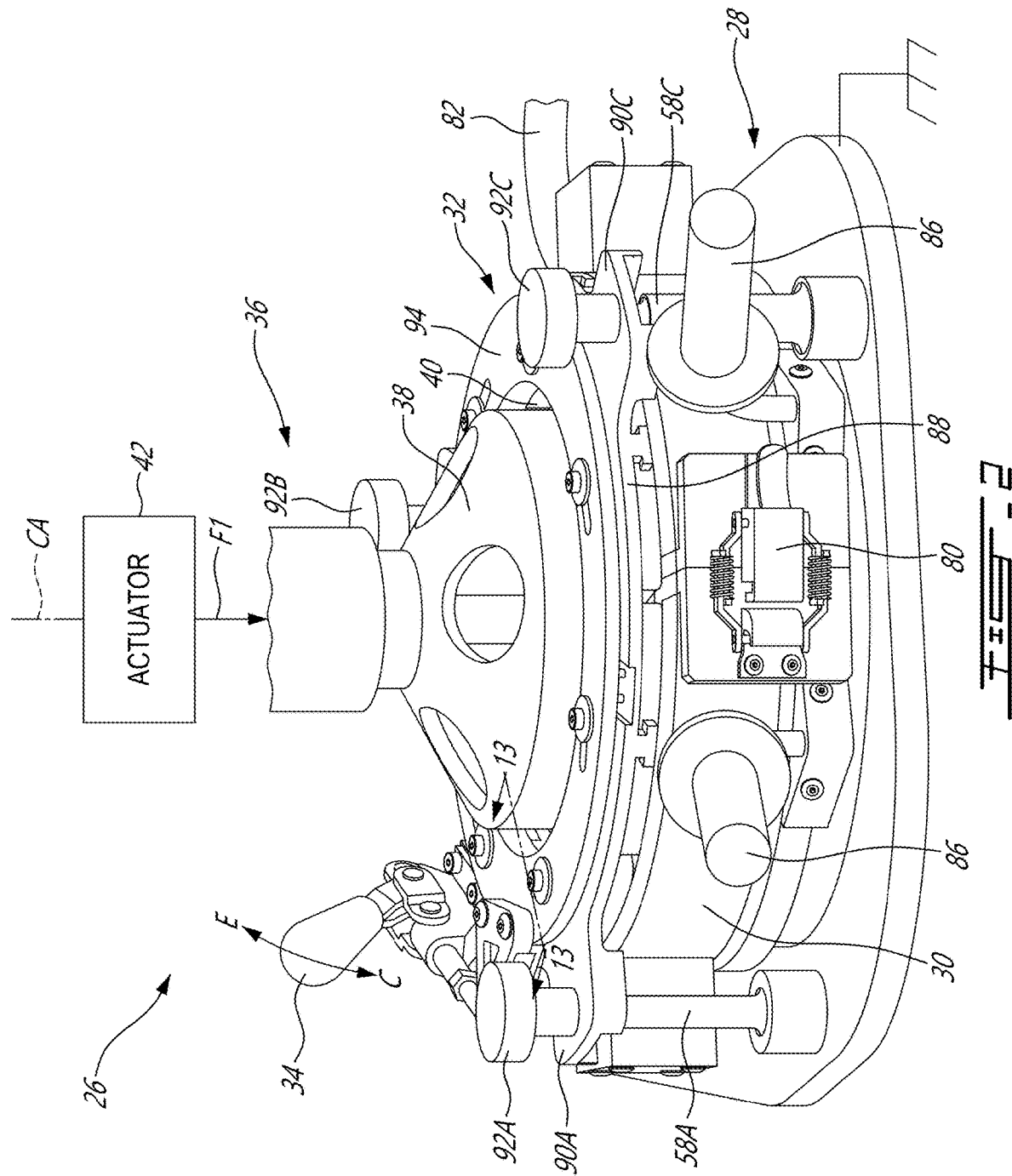
FIG. 2 is a perspective view of a tool for assembling the vane ring of the engine of FIG. 1.

FIG. 2 is a perspective view of an exemplary tool 26 for assembling vane ring 24 of engine 10 or another vane ring. In some embodiments, tool 26 may facilitate the assembly of vane ring 24, which may include a plurality of components that are press-fitted together. In the configuration of tool 26 shown in FIG. 2, the components of vane ring 24 may be disposed inside of tool 26 and may not be readily visible from the vantage point of FIG. 2. In some embodiments, tool 26 may promote desirable relative positioning of components and ease of use to reduce the risk of damaging components of vane ring 24 during assembly of vane ring 24. Tool 26 may include base 28 configured to receive components of vane ring 24 (e.g., individually or in groupings) in preparation for assembly of vane ring 24. Tool 26 may include (e.g., electric) heater 30 operable to apply heat to and cause thermal expansion of one or more components of vane ring 24 during the assembly of vane ring 24.

Tool 26 may include actuatable jaws 32 configured to urge one or more components of vane ring 24 radially outwardly (i.e., apply a pre-load on some components) during the assembly of vane ring 24. Jaws 32 may be actuatable from a contracted configuration C to an expanded configuration E by the actuation of manual lever 34. Alternatively, jaws 32 may be actuated by way of an electric, pneumatic or hydraulic actuator for example. The use of jaws 32 may promote desirable relative positioning of components of vane ring 24 during press fitting.

Tool 26 may include press 36 operable to apply an axial force F1 downwardly along central axis CA against one or more components of vane ring 24 to press fit the one or more components together during the assembly of vane ring 24. Press 36 may include drift 38 defining an interface for applying axial force F1 against the one or more components of vane ring 24. Jaws 32 may define a central opening 40 that is sized to permit a passage of drift 38 therethrough. Press 36 may include (e.g., hydraulic) actuator 42 such as a hydraulic cylinder to generate axial force F1 that is applied to one or more components of vane ring 24 via drift 38. In various embodiments, actuator 42 of press 36 may include an electric or pneumatic actuator to generate axial force F1 for example. Other components of tool 26 and the operation of tool 26 for the assembly of vane ring 24 are described below.

Figure 3:
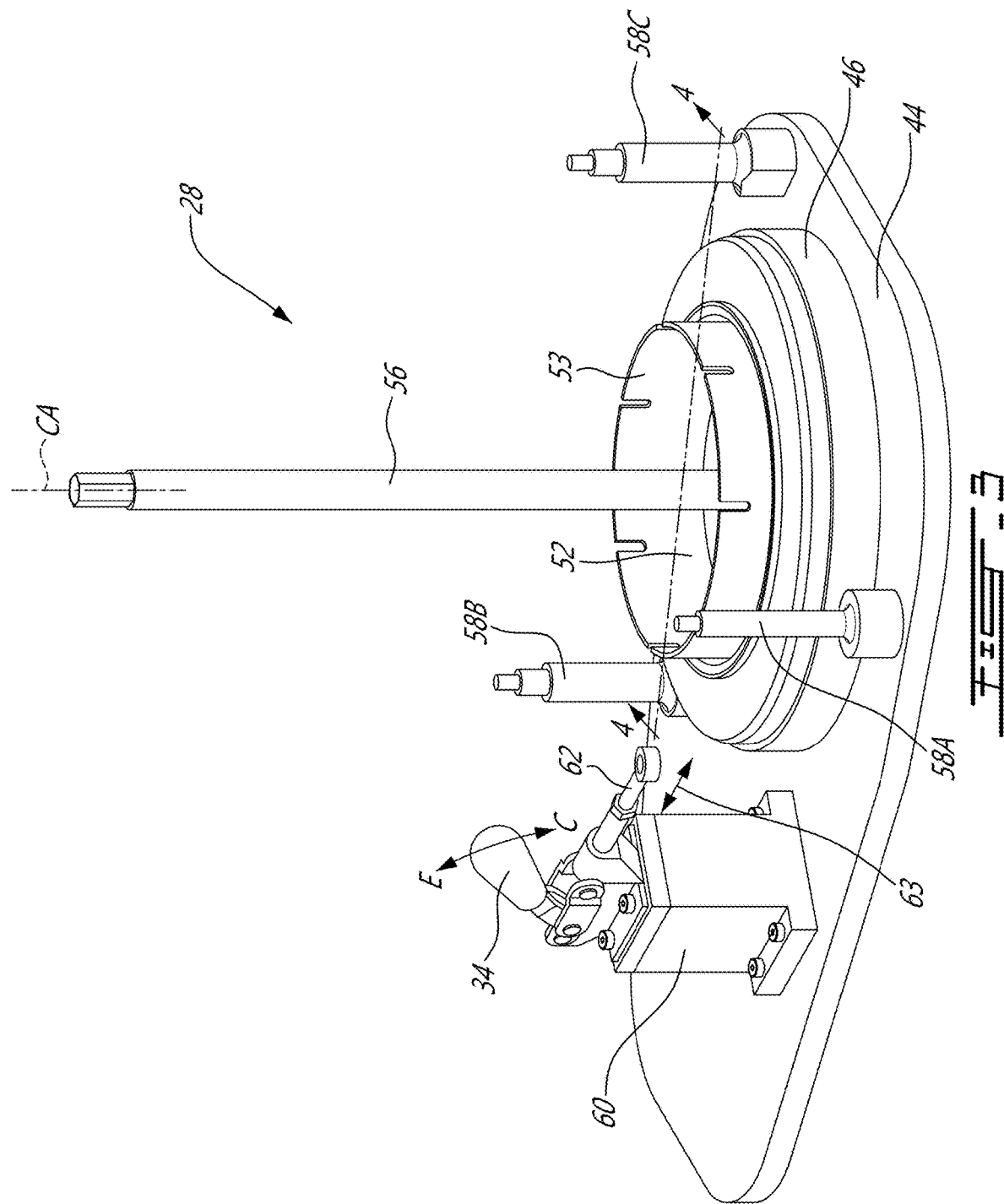
FIG. 3 is a perspective view of a base of the tool of FIG. 2.

FIG. 3 is a perspective view of base 28 of tool 26. Base 28 may receive and hold components of vane ring 24 and components of tool 26 to facilitate the assembly of vane ring 24. Base 28 may include platform 44 onto which other components of base 28 are secured (e.g., fastened). Base 28 may include hub 46 secured to base 28 and configured to receive outer ring 48 of vane ring 24 and optionally also vane segments 50 (shown in FIG. 4) of vane ring 24. Hub 46 may define an interface for receiving outer ring 48 and vane segments 50 thereon in order to locate outer ring 48 on hub 46. In some embodiments, hub 46 may have a geometry that at least partially conforms to the geometry of outer ring 48 so that outer ring 48 may be seated and retained on hub 46 during assembly of vane ring 24. For example, a cylindrical surface of hub 46 may be received inside of outer ring 48 and engage (e.g., mate) with a cylindrical surface of outer ring 48. In some embodiments, hub 46 may have a generally annular shape.

Base 28 may include guide plate 52, which may include a generally cylindrical projection 53 extending axially upwardly and away relative to platform 44. Cylindrical projection 53 of guide plate 52 may extend through a central opening of hub 46. In other words, cylindrical projection 53 of guide plate 52 may be disposed radially inwardly of hub 46. Guide plate 52 may be secured to platform 44 or may be movably mounted to platform 44. For example, guide plate 52 may be axially movable along central axis CA. In some embodiments, movement of guide plate 52 transverse to central axis CA may be prevented, and angular movement of guide plate 52 about central axis CA may also be prevented. As explained further below, guide plate 52 may assist with the positioning of vane segments 50 between guide plate 52 and outer ring 48. Guide plate 52 may also assist with the installation of inner support 54 (shown in FIG. 5) of vane ring 24.

Base 28 may include central rod 56 extending coaxially with central axis CA. Central rod 56 may be secured (e.g., fastened) to platform 44. Central rod 56 may serve to guide the axial movement of drift 38 along central axis CA during the application of axial force F1 onto inner support 54 for example. In some embodiments, central rod 56 and hub 46 may be coaxial. In some embodiments, central rod 56, hub 46 and cylindrical projection 53 of guide plate 52 may be coaxial.

Base 28 may include one or more (e.g., three) posts 58A-58C secured (e.g., fastened) to platform 44 and extending upwardly from platform 44. Post(s) 58A-58C may be used to secure part of jaws 32 to platform 44. Posts 58A-58C may be angularly spaced apart about central axis CA and may be secured to platform 44 at respectively locations that are radially outward of hub 46.

Manual lever 34 may be secured (e.g., fastened) to platform 44 via spacer block 60 so that manual lever 34 may be raised from platform 44. Manual lever 34 may be operatively connected to push/pull rod 62 so that the actuation of manual lever 34 may correspondingly cause a linear actuation of push/pull rod 62 along arrow 63. For example, a movement of manual lever 34 toward expanded configuration E may cause an extension of push/pull rod 62, and a movement of manual lever 34 toward contracted configuration C may cause a retraction of push/pull rod 62.

Figure 4:
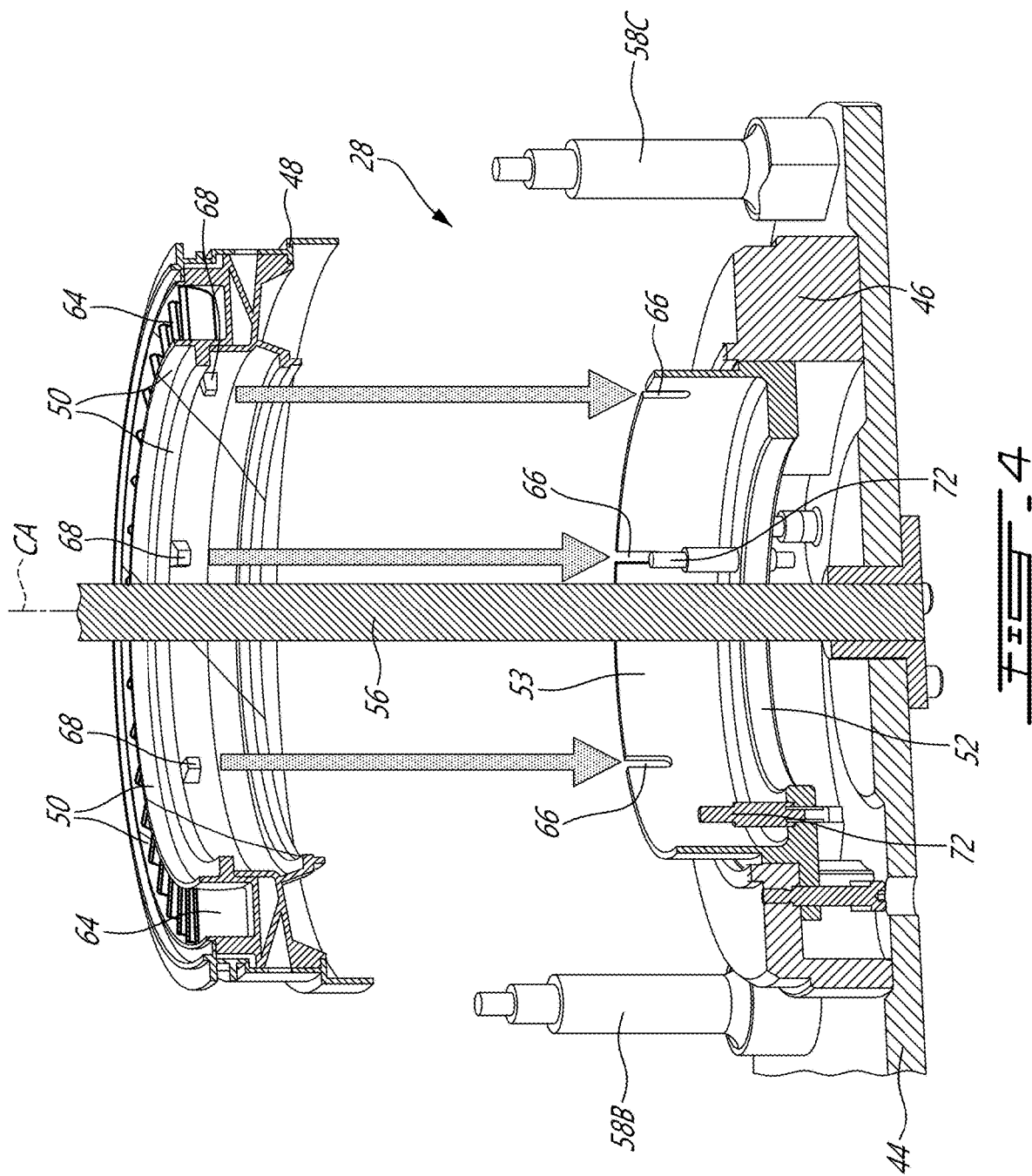
FIG. 4 is a perspective cross-section view of part of the base of the tool taken along line 4-4 in FIG. 3 showing part of the vane ring being received on the base.

FIG. 4 is a perspective cross-sectional view of part of base 28 of tool 26 taken along line 4-4 in FIG. 3. FIG. 4 also shows part of vane ring 24 that is sectioned along the same line 4-4. Vane ring 24 may include outer ring 48 and a plurality of vane segments 50 that are disposed radially inwardly of outer ring 48 and that are angularly distributed about central axis CA. Each vane segment 50 may include one or more stator vanes 64 that interact with the flow of gas in core gas path 20 of engine 10 and that change the orientation of the flow of gas in core gas path 20. As illustrated in FIG. 4 adjacent vane segments 50 may interface with (e.g., contact) one another along an interface that is oriented obliquely relative to central axis CA. The number of vane segments 50 and the number of stator vanes 64 per vane segment 50 may vary depending on the size of and configuration of vane ring 24. In the example shown in FIG. 4, vane ring 24 may include seven separate vane segments 50.

Depending on the configuration of outer ring 48 and vane segments 50, outer ring 48 and vane segments 50 (and optionally also seal 118 shown in FIG. 13) may be pre-assembled together outside of tool 26 and then received onto base 28 together as a unit. As shown in FIG. 4, outer ring 48 and vane segments 50 may be lowered as a unit onto base 28 along central axis CA. Alternatively, outer ring 48, vane segments 50 and optionally also seal 118 may be individually installed on base 28. As outer ring 48 is lowered onto hub 46, one or more surfaces of outer ring 48 may engage with hub 46 so that hub 46 may cause outer ring 48 to become coaxial with hub 46 and with central axis CA. In some embodiments, a radially outer surface of hub 46 may be axially tapered so that when the radially outer surface of hub 46 is received inside part of outer ring 48, the gradual lowering of outer ring 48 onto hub 46 will cause outer ring 48 to gradually become aligned with hub 46 and also become seated onto hub 46.

Guide plate 52 may assist with locating vane segments 50 around central axis CA. For example, guide plate 52 and vane segments 50 may include cooperating locating features that allow angular alignment (i.e., locating) of vane segments 50 around central axis CA. In other words, the locating features on guide plate 52 and vane segments 50 may allow vane segments 50 to be clocked about central axis CA. In some embodiments, such locating features may include one or more receptacles 66 defined in guide plate 52 and configured to receive respective bosses 68 (i.e., protrusions) defined on one or more vane segments 50. In some embodiments, each vane segment 50 may include one or more bosses 68, and guide plate 52 may include a corresponding number of receptacles 66.

In some embodiments, receptacle(s) 66 may be defined in cylindrical projection 53 of guide plate 52, and boss(es) 68 may project radially inwardly from one or more radially-inward-facing surfaces of vane segment(s) 50. In some embodiments, receptacle(s) 66 may include one or more slots extending axially relative to central axis CA and each having an open axial end for receiving a respective boss 68 therein when vane segment(s) 50 is/are lowered along central axis CA and received on base 28 by an axial movement of vane segment(s) 50 relative to base 28.

In some embodiments, one or more receptacles may instead be defined in one or more vane segments 50 and one or more corresponding bosses may be defined on guide plate 52. In some embodiments, guide plate 52 may include one or more receptacles and one or more bosses, and vane segments 50 may include corresponding one or more receptacles and one or more bosses. It is understood that other types of angular locating features (e.g., pin, hole, key and key way) between vane segments 50 and guide plate 52 may be suitable.

Figure 5:
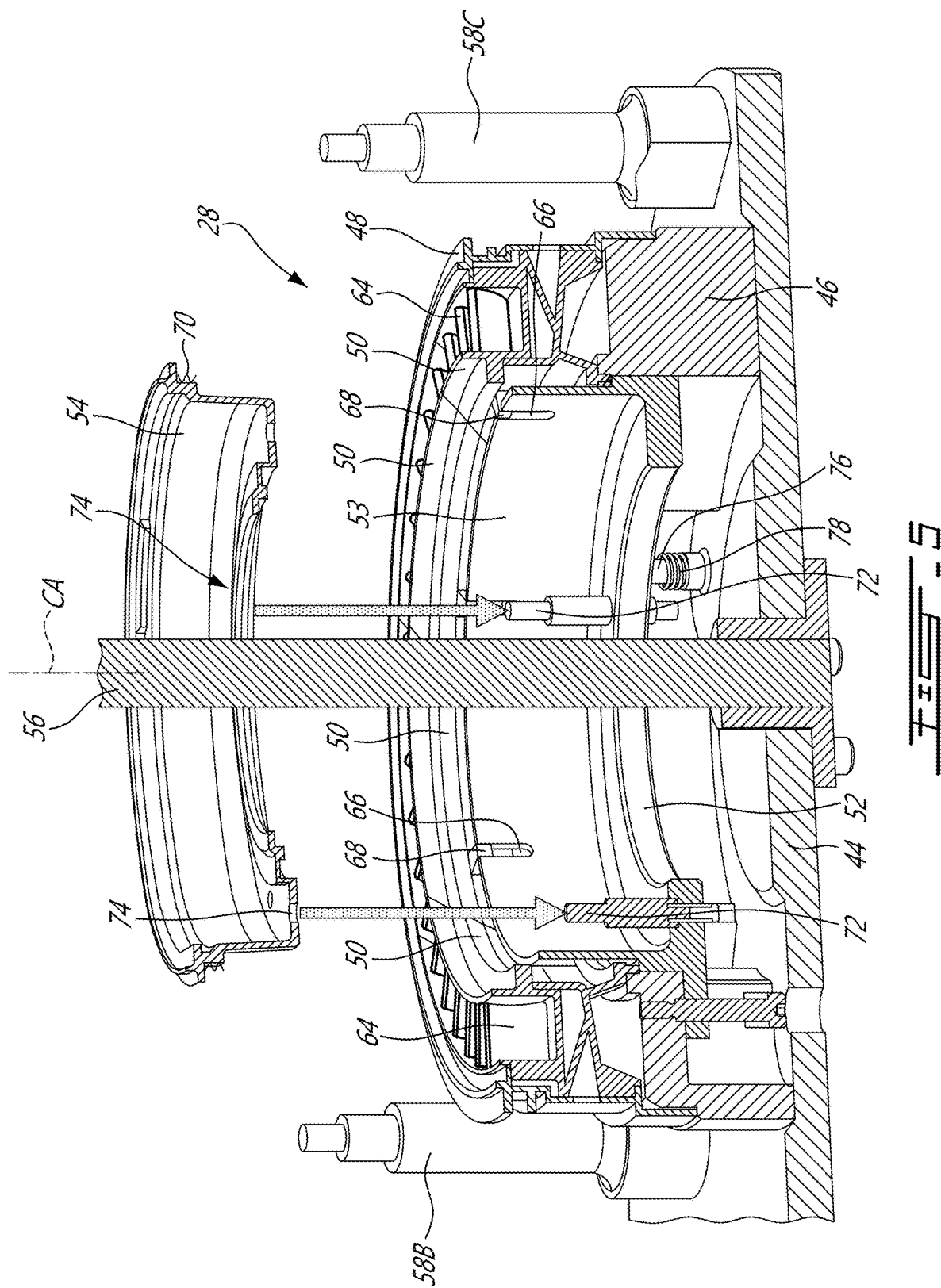
FIG. 5 is a perspective cross-section view of part of the base of the tool taken along line 4-4 in FIG. 3 showing another part of the vane ring being received on the base.

FIG. 5 is a perspective cross-sectional view of part of base 28 of tool 26 taken along line 4-4 in FIG. 3 showing outer ring 48 and vane segments 50 being received onto hub 46 where vane segments 50 are disposed radially between cylindrical projection 53 and outer ring 48. FIG. 5 also shows inner support 54 and seal 70 that are sectioned along the same line 4-4. Inner support 54 may have a generally annular shape and may define a central hub of vane ring 24. Vane ring 24 may include seal 70 that is compressed (i.e., press-fitted) between inner support 54 and vane segments 50. Seal 70 may have a generally annular shape extending around central axis CA and may be pre-installed onto the exterior of inner support 54 so that inner support 54 and seal 70 may be received onto base 28 as a unit. Seal 70 may be made from a metallic material and may have a corrugated (e.g., W-shaped) cross-sectional profile. FIG. 5 shows the process of receiving inner support 54 and seal 70 onto base 28 by lowering inner support 54 and seal 70 together along central axis CA. Installing inner support 54 onto base 28 may include partially receiving inner support 54 radially inwardly of vane segments 50.

Guide plate 52 and inner support 54 may include cooperating locating features that allow (e.g., angular) alignment (i.e., locating) of inner support 54 around central axis CA. In some embodiments, the locating features on guide plate 52 and inner support 54 may allow inner support 54 to be clocked about central axis CA and also be clocked relative to the previously clocked vane segments 50. In some embodiments, such locating features may include one or more pins 72 integrally formed with guide plate 52 or otherwise secured (e.g., fastened) to guide plate 52, and configured to be received in one or more corresponding holes 74 defined in inner support 54. It is understood that other types of locating features (e.g., bosses, slots) between inner support 54 and guide plate 52 may be suitable.

In some embodiments, guide plate 52 may be movable along one or more axial guides 76 (e.g., pins) and be spring-loaded via one or more springs 78 disposed between guide plate 52 and platform 44. Accordingly, guide plate 52 may be movable axially along central axis CA to accommodate axial movement of inner support 54 during installation of inner support 54 while maintaining the desired angular orientation of inner support 54. For example, inner support 54 may be manually lowered toward base 28 to partially be received radially inwardly of vane segments 50. However, when axial force F1 is applied to inner support 54 via drift 38, inner support 54 may undergo additional axial displacement to complete the installation of inner support 54. Accordingly, guides 76 and springs 78 may allow guide plate 52 to maintain engagement with inner support 54 and move downwardly with inner support 54 while inner support 54 is being installed.

Figure 6A:
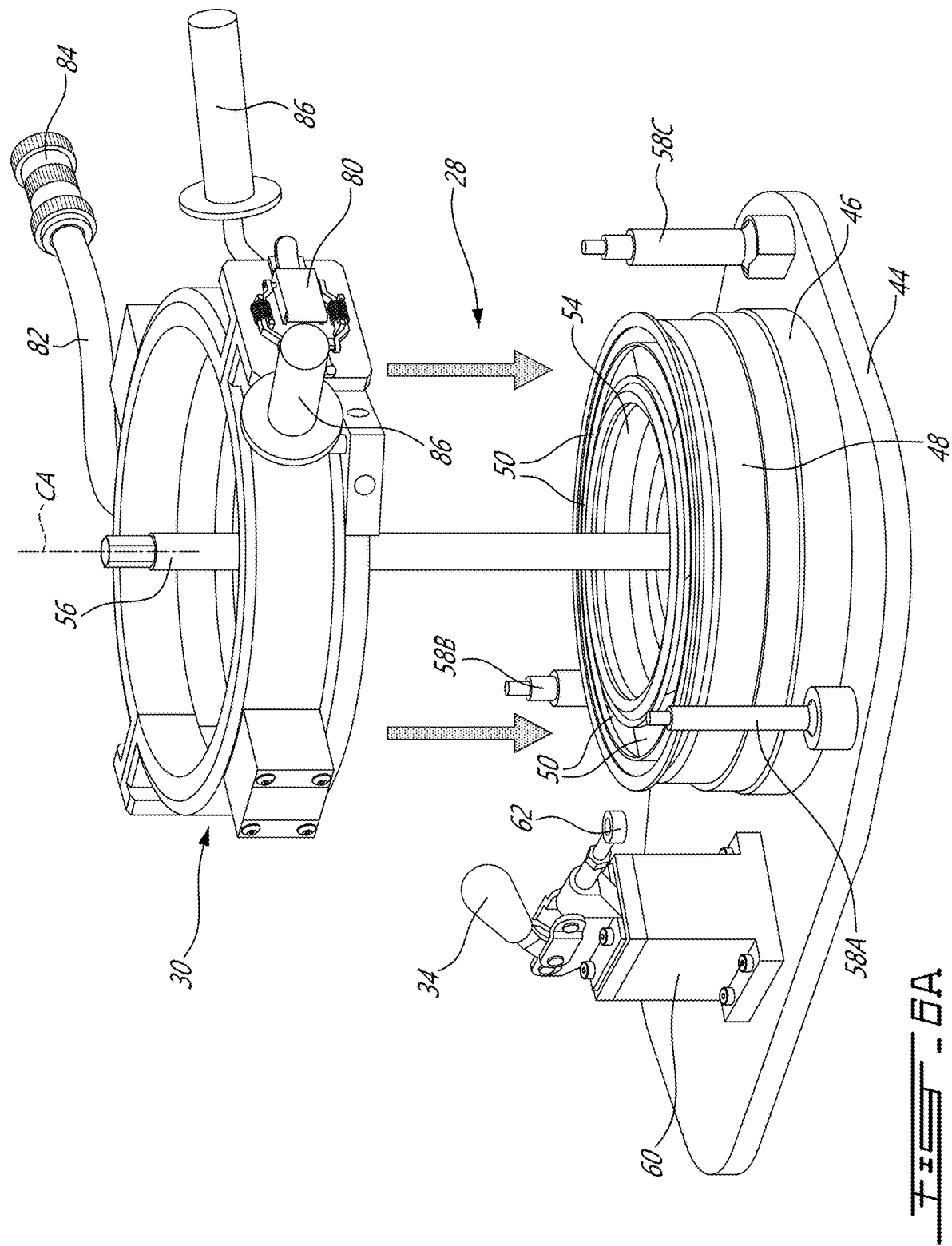
FIG. 6A is a perspective view showing a heater being installed onto an outer ring of the vane ring after the outer ring has been received on the base of the tool.

FIG. 6A is a perspective view showing heater 30 being installed onto outer ring 48 of vane ring 24 after outer ring 48, vane segments 50 and inner support 54 have been received on base 28 of tool 26. Heater 30 may be configured to apply heat to outer ring 48 by conductive heat transfer. Heater 30 may extend along a majority or substantially an entirety of the outer circumference of outer ring 48. Heater 30 may be installed by lowering heater 30 toward base 28 and along central axis CA. Heater 30 may be installed on an exterior of outer ring 48 and placed in contact with a radially outer surface of outer ring 48. Heater 30 may have a generally annular shape that may be expanded to allow heater 30 to be installed around outer ring 48 and contracted to establish physical contact with outer ring 48 to permit conductive heat transfer therewith. The expansion and contraction of heater 30 may be achieved by the opening and closing of clasp 80.

Heater 30 may be electrically powered and may include a resistive heating element. Heater 30 may be electrically connected to an electric power source via cable 82 and connector 84. Heater 30 may include one or more handles 86 to facilitate the installation and removal of heater 30.

Figure 6B:
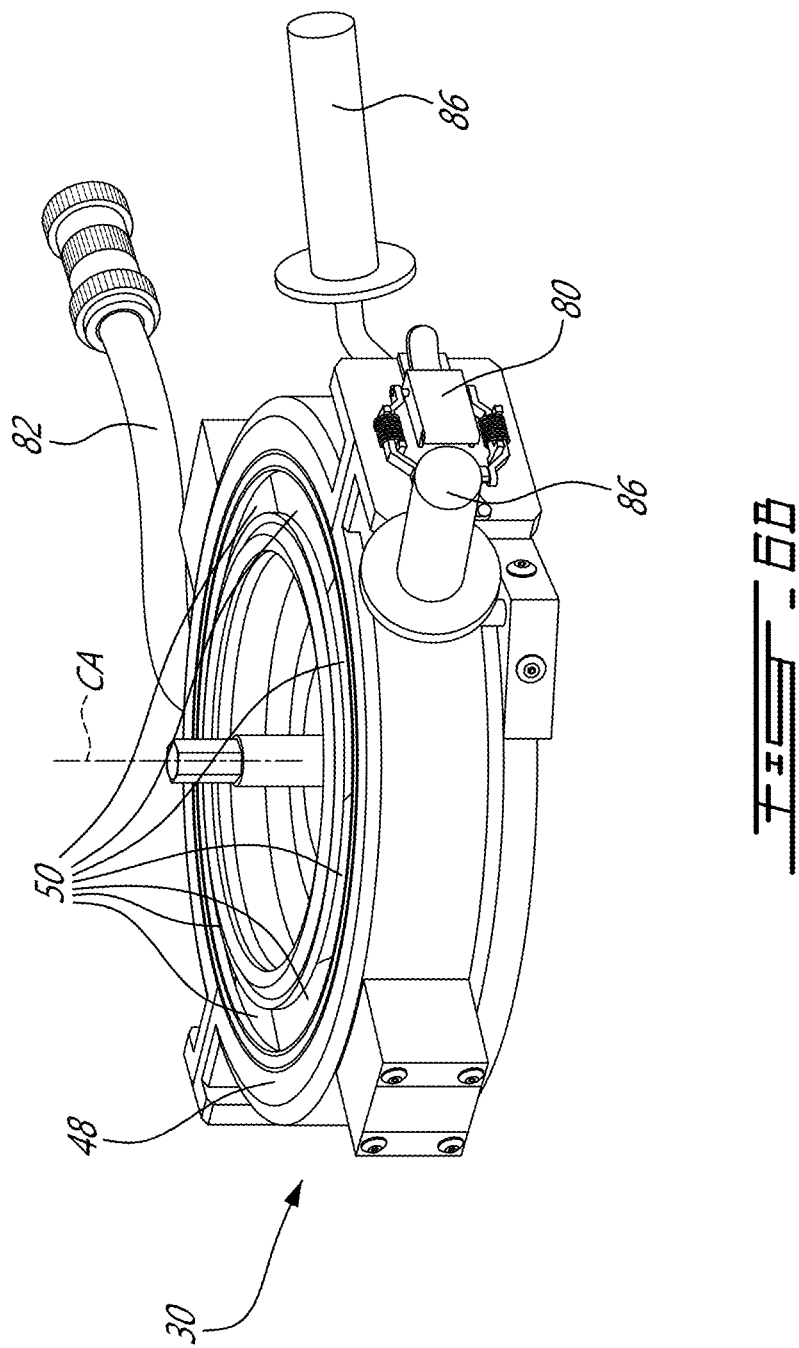
FIG. 6B is a perspective view of the heater installed onto the outer ring of the vane ring before receiving the outer ring on the base of the tool.

FIG. 6B is a perspective view of heater 30 installed onto outer ring 48 of vane ring 24 before installing outer ring 48 on base 28 of tool 26. For example, heater 30, outer ring 48 and optionally vane segments 50 and seal 118 (shown in FIG. 13) may be pre-assembled together outside of tool 26 and then received onto base 28 together as a unit.

FIG. 7A is a perspective view showing jaws 32 being installed onto base 28 of tool 26 after outer ring 48, vane segments 50, inner support 54 and heater 30 have been received on base 28. Jaws 32 may be installed by lowering jaws 32 toward base 28 and along central axis CA. Jaws 32 may serve as a lid containing the components of vane ring 24 inside tool 26. Jaws 32 may define central opening 40 extending therethrough. Jaws 32 may have a generally annular shape and may be installed to be coaxial with central axis CA. In other words, central axis CA may extend through central opening 40 defined through jaws 32. Jaws 32 may include stationary ring 88 configured to be secured to base 28. Stationary ring 88 may include one or more perforated tabs 90A-90C extending radially outwardly. Stationary ring 88 may be secured to base 28 by way of fastening tabs 90A-90C to respective posts 58A-58C using respective threaded fasteners 92A-92C (shown in FIG. 2).

Jaws 32 may include movable ring 94 movably mounted to stationary ring 88 and being rotatable about central axis CA relative to stationary ring 88. Movable ring 94 may be rotatable about central axis CA within a prescribed angular range. In some embodiments, movable ring 94 may be fastened to stationary ring 88 by way of one or more threaded fasteners 95 and slotted holes defined in movable ring 94 so that the length of the slotted holes may define the angular range of motion of movable ring 94 relative to stationary ring 88. Jaws 32 may include one or more radially movable pads 96. Pads 96 may be operatively connected to movable ring 94 and actuatable by movement of movable ring 94 relative to stationary ring 88. When installed on base 28, pads 96 of jaws 32 may be used to urge vane segments 50 radially outwardly toward outer ring 48 during assembly of vane ring 24 as explained below.

Figure 7B:
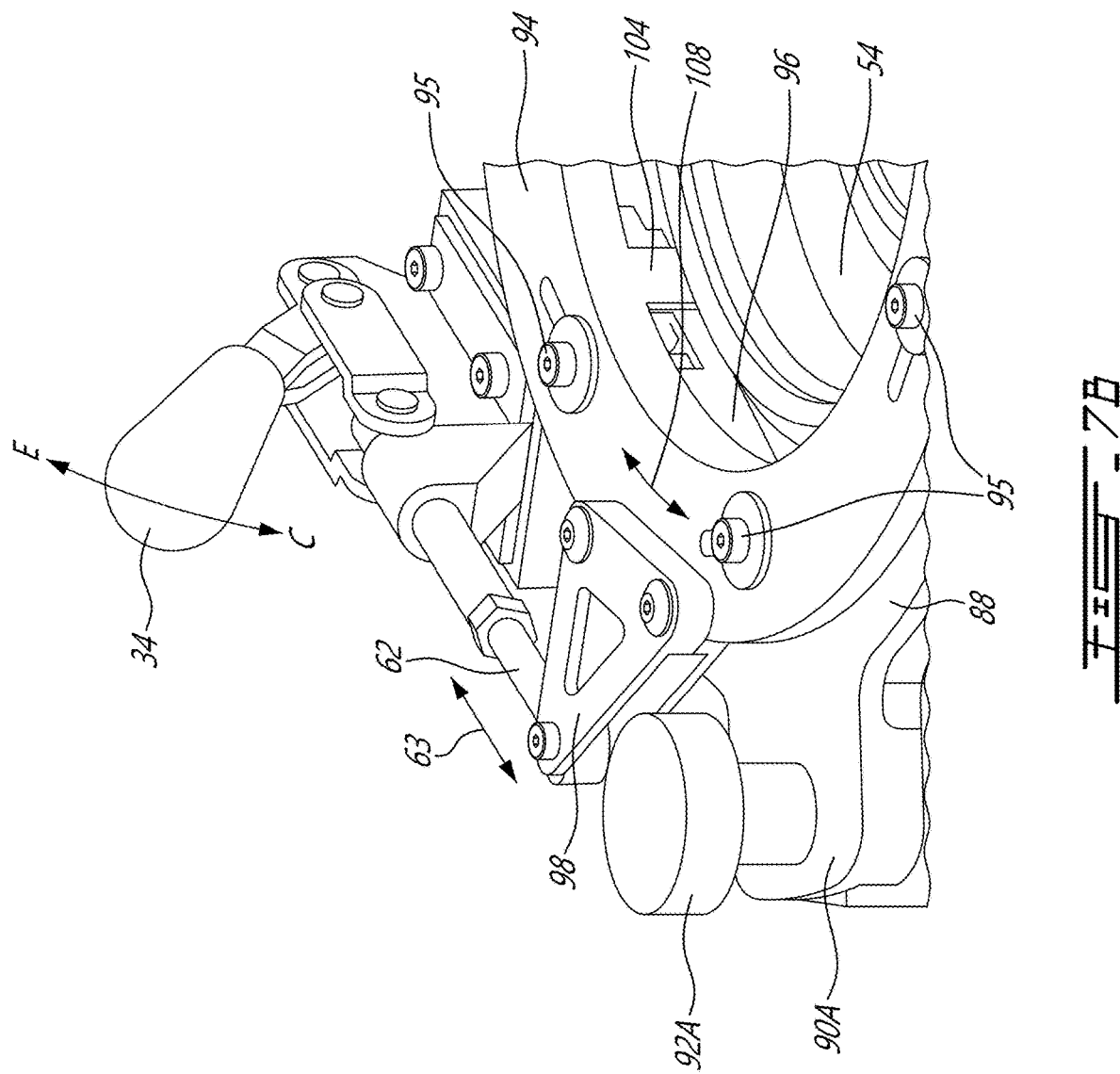
FIG. 7B is a perspective view showing a connection between a manual lever and the jaws for actuating the jaws.

FIG. 7B is an enlarged perspective view showing connector 98 between manual lever 34 and jaws 32 to permit jaws 32 to be actuated using manual lever 34. Connector 98 may drivingly connect push/pull rod 62 to movable ring 94. For example, movement of push/pull rod 62 along arrow 63 may be orientated to be at least partially tangential to central axis CA, which may correspond to the axis of rotation of movable ring 94. Accordingly, the actuation of manual lever 34 may be converted to rotational motion of movable ring 94 along arrow 108. Movement of manual lever 34 toward contracted configuration C may cause rotation of movable ring 94 in one direction and movement of manual lever 34 toward expanded configuration E may cause rotation of movable ring 94 in the opposite direction.

FIG. 8 is a perspective view of jaws 32 in isolation. FIG. 8 shows a lower side of jaws 32 on which movable pads 96 are movably mounted. Pads 96 may be angularly distributed about central opening 40 of jaws 32 and about central axis CA. The number and positioning of pads 96 may correspond to the number and positioning of vane segments 50 so that each pad 96 may be associated with a corresponding vane segment 50. The securing of jaws 32 to posts 58A-58C may set the angular positioning of jaws 32 and may result in the angular positioning of pads 96 to be in register with the angular positioning of vane segments 50 previously set via receptacle(s) 66 and boss(es) 68. Accordingly, each pad 96 may be actuatable to urge a corresponding vane segment 50 radially outwardly toward outer ring 48.

Stationary ring 88 may be disposed axially between movable ring 94 and pads 96. Pads 96 may be movably engaged with stationary ring 88 so that rotation of pads 96 about central axis CA relative to stationary ring 88 is prevented but radial movement of pads 96 relative to stationary ring 88 is permitted. Such (e.g., sliding) engagement of pads 96 with stationary ring 88 may be achieved by way of radial guides between pads and stationary ring 88. Such radial guides may include respective rails 100 secured to stationary ring 88 and corresponding slots formed in pads 96. Rails 100 and the corresponding slots may be oriented at least partially radially to permit pads 96 to move radially outwardly to define the expanded configuration E of jaws 32 and to permit pads 96 to move radially inwardly to define the contracted configuration C of jaws 32. The radial guides may permit radial sliding movement of pads 96 relative to stationary ring 88. In some embodiments, rails 100 may be integrally formed with stationary ring 88. Rails 100 may be angularly spaced apart around stationary ring 88. The number of rails 100 may correspond to the number of pads 96 so that each rail 100 may be associated with a respective pad 96. In some embodiments, rails 100 may each have a T-shaped cross-sectional profile and the slots may have a corresponding T-shaped cross-sectional profile as well. Rails and slots of other cross-sectional profiles may be suitable. In some embodiments, rails 100 may secured to or integrally formed with respective pads 96 and the slots may be formed in stationary ring 88 instead.

During operation of jaws 32, stationary ring 88 may be secured to base 28 and movable ring 94 may be rotatable about central axis CA relative to stationary ring 88. Movable ring 94 may be coaxial with stationary ring 88 and may also be coaxial with central axis CA. Movable ring 94 may be operatively connected to pads 96 to actuate pads 96 toward expanded configuration E of jaws 32. Pads 96 may be drivingly connected to movable ring 94 by way of respective cams 104 and follower surfaces 106 so that rotational movement movable ring 94 may be converted to radially outward movement of pads 96. Cams 104 may be located radially inwardly of their respective pads 96. Cams 104 may be connected to movable ring 94 via central opening 40 through stationary ring 88 so that cams 104 may be rotatable together with movable ring 94. The number of cams 104 may correspond to the number of pads 96 so that each cam 104 may be associated with a respective pad 96. In some embodiments, one or more pads 96 may each be associated with more than one cam 104.

Figure 9:
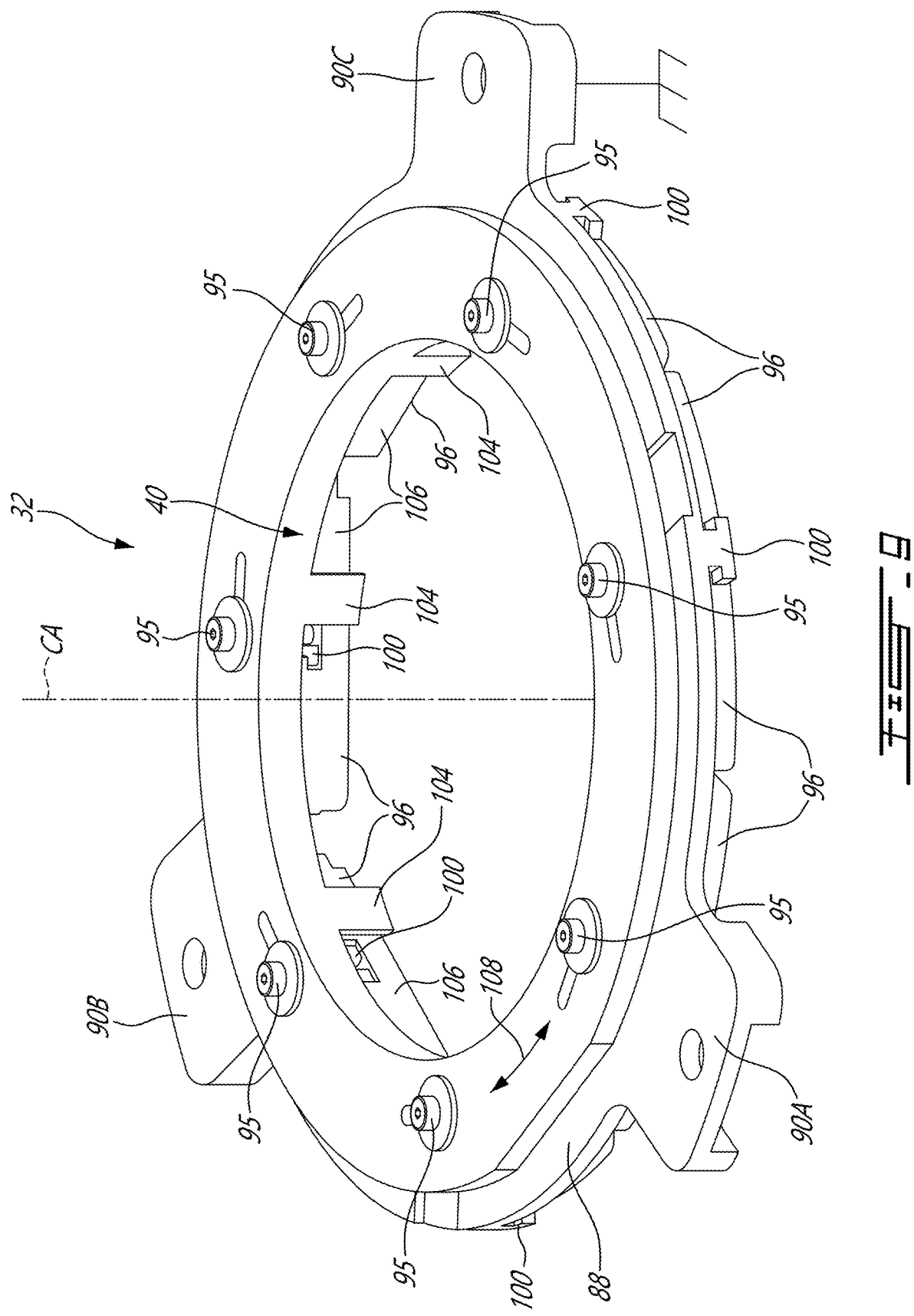
FIG. 9 is another perspective view of the jaws showing a movable ring of the jaws.

FIG. 9 is a another perspective view of jaws 32 in isolation. FIG. 9 shows an upper side of jaws 32 on which movable ring 94 is mounted. When stationary ring 88 is secured to base 28, the actuation of manual lever 34 may be converted to rotational motion of movable ring 94 along arrow 108. When manual lever 34 is actuated toward the expanded configuration E, the one or more pads 96 of jaws 32 may be urged radially outwardly to define the expanded configuration E of jaws 32. When manual lever 34 is actuated toward the contracted configuration C, the one or more cams 104 may release the corresponding one or more pads 96 of jaws 32 so that pads 96 may then be manually pushed radially inwardly to define the contracted configuration C of jaws 32.

In some embodiments, the engagement between pads 96 and stationary ring 88 may define one or more hard stops to limit the radial outward and/or inward movement of pads 96 and thereby prevent pads 96 from becoming disengaged from stationary ring 88 during handling and installation of jaws 32.

FIGS. 10A and 10B are schematic top plan views of one of pads 96 of jaws 32 actuatable using cam 104 and shown in contracted configuration C of jaws 32 and in expanded configuration E of jaws 32. Cam 104 may be configured to rotate with movable ring 94 and transform rotary motion of cam 104 about central axis CA into linear motion of pad 96 radially outwardly through the engagement of cam 104 with follower surface 106.

FIGS. 10A and 10B show an arcuate path P along which cam 104 travels as cam 104 is rotated about central axis CA along arrow 108. Since the profile of follower surface 106 does not follow the same path P, this creates an interference between cam 104 and follower surface 106 as cam 104 travels along path P. As shown in FIGS. 10A and 10B, the profile of follower surface 106 as viewed along central axis CA may be asymmetric about radial line 110. Since path P of cam 104 causes cam 104 to intersect pad 96, the movement of cam 104 and the engagement of cam 104 with follower surface 106 causes pad 96 to be urged radially outwardly toward expanded configuration E. The amount of travel of pad 96 may be selected through the amount of travel of cam 104 and also through the geometric profile of follower surface 106.

FIGS. 10A and 10B show an example of a single-acting cam arrangement where cam 104 pushes pad 96 radially outwardly but does not pull pad 96 radially inwardly when cam 104 is returned to the position in FIG. 10A. In this scenario, the operator may manually return pads 96 toward the contracted configuration C of jaws 32 when cam 104 is returned to the position in FIG. 10A. However, some embodiments of jaws 32 may included a double-acting cam arrangement where a cam travels in a slot formed in the pad and the cam is operable to push the pad radially outwardly and also pull the pad radially inwardly by reversing the motion of the cam.

FIG. 11 is a schematic top plan view of an alternate mechanism for actuating one or more pads 96 by the rotation of movable ring 94. A single linkage 112 is shown in FIG. 11 but embodiments of jaws 32 may include such linkage 112 associated with each pad 96 that must be actuated radially. Linkage 112 may include first link 114A having a first end pivotally connected to stationary ring 88 or other structure that is stationary relative to movable ring 94. Linkage 112 may include second link 114B having a first end pivotally connected to a second end of first link 114A via pivot pin 116. Second link 114B may have a second end that is pivotally connected to pad 96.

Pivot pin 116 may be connected to movable ring 94 and be rotatable with movable ring 94 along arrow 108 to cause radial movement of pad 96 between contracted configuration C and expanded configuration E of jaws 32. Linkage 112 may be double acting so that rotation of movable ring 94 in one direction causes radially outward movement of pad 96 toward expanded configuration E, and rotation of movable ring 94 in the opposite direction causes radially inward movement of pad 96 toward contracted configuration C.

FIG. 12 is a perspective view showing drift 38 being passed through central opening 40 of jaws 32 to access inner support 54 of vane ring 24. FIG. 12 shows drift 38 being installed onto base 28 of tool 26 after outer ring 48, vane segments 50, inner support 54, heater 30 and jaws 32 have been received on base 28. Drift 38 may be installed by lowering drift 38 toward base 28 and along central axis CA. Drift 38 may include a lower annular interface for applying axial force F1 against inner support 54 when components of vane ring 24 are press-fitted together. Once drift 38 has been lowered and installed to engage with inner support 54, the configuration of tool 26 as shown in FIG. 2 may be achieved. In this configuration, the components of vane ring 24 may be seated at desirable relative positions in preparation for axial force F1 to be exerted to achieve press fitting of the components of vane ring 24 together.

Figure 13:
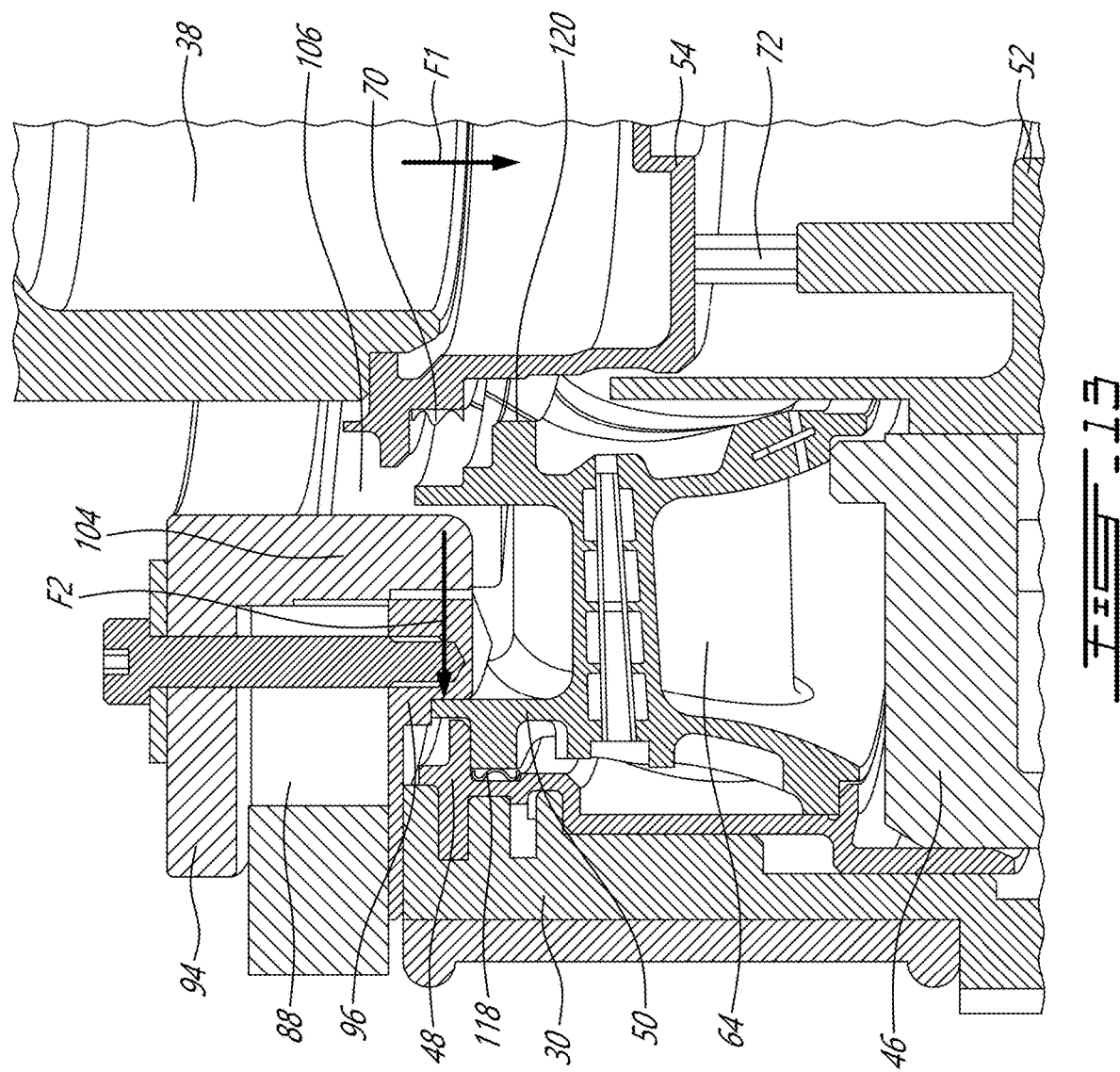
FIG. 13 is a perspective cross-section view of the tool of FIG. 2 and components of the vane ring taken along line 13-13 in FIG. 2.

FIG. 13 is a perspective cross-sectional view of tool 26 of FIG. 2 along line 13-13 of FIG. 2 just prior to the application of axial force F1 to achieve the press fitting of the components of vane ring 24. At this stage of assembly, heater 30 may be active to apply heat to outer ring 48 and may have reached a steady state temperature. The application of heat may be sufficient to cause some thermal expansion of outer ring 48 to assist with the subsequent press fitting between outer ring 48, vane segments 50 and inner support 54. Heater 30 may be controlled to maintain a desired temperature (or temperature range) of outer ring 48 or of another component that is heated by heater 30.

At this stage of assembly and while heat is being applied to outer ring 48, jaws 32 may be in expanded configuration E so that cams 104 are urging pads 96 radially outwardly and consequently, pads 96 are urging vane segments 50 radially outwardly against outer ring 48. The amount of radial force F2 that is applied by jaws 32 may only be sufficient to take up slack between the floating vane segment 50 and outer ring 48 and hold the components in place in preparation for the subsequent press fitting.

Vane ring 24 may include seal 118 that is intended to be compressed (i.e., press-fitted) between vane segments 50 and outer ring 48. Seal 118 may have a generally annular shape extending around central axis CA and may be pre-installed between vane segments 50 and outer ring 48 so that vane segments 50, outer ring 48 and seal 118 may be received onto base 28 as a unit. Seal 118 may be made from a metallic material and may have a corrugated (e.g., W-shaped) cross-sectional profile. In the expanded configuration E, jaws 32 may take up slack between vane segment 50, seal 118 and outer ring 48 and hold the components in place in preparation for the subsequent press fitting. In some embodiments, the expansion of jaws 32 may apply a compressive radial pre-loading of seal 118.

As inner support 54 is lowered and further inserted radially inwardly of vane segments 50, seal 70 may become disposed and compressed between inner surface 120 of vane segments 50 and an outer surface of inner support 54. Inner surface 120 may be chamfered or otherwise axially tapered to facilitate the placement of seal 70. As inner support 54 is further lowered and urged downwardly by drift 38 toward complete installation, a greater radial force F2 is generated and further compression of seals 70, 118 is achieved. In some embodiments, only the resilient compression of seals 70, 118 may solely establish the press fitting between the components of vane ring 24. In some embodiments, other surfaces within vane ring 24 that are not separated by seals may be in direct press fitting engagement.

Once inner support 54 has been driven to its final position by drift 38, heater 30 may be deactivated and the assembled vane ring 24 may be allowed to cool. During cooling of vane ring 24, some of axial force F1 applied to inner support 54 may be maintained by drift 38 to hold inner support 54 in place for a prescribed time duration. Once sufficient cooling of the assembled (i.e., press-fitted) vane ring 24 has occurred, axial force F1 may be removed, tool 26 may be dismantled by reversing the steps described herein and vane ring 24 may be withdrawn from base 28.

Components of tool 26 may be made from metallic materials (e.g., steel) suitable for tooling applications. In some embodiments, pads 96 may be made from a non-metallic material that can withstand the temperatures of vane ring 24 that are expected during assembly of vane ring 24. In some embodiments, pads 96 may be made from a polymeric material such as polyether ether ketone (PEEK) for example.

Figure 14:
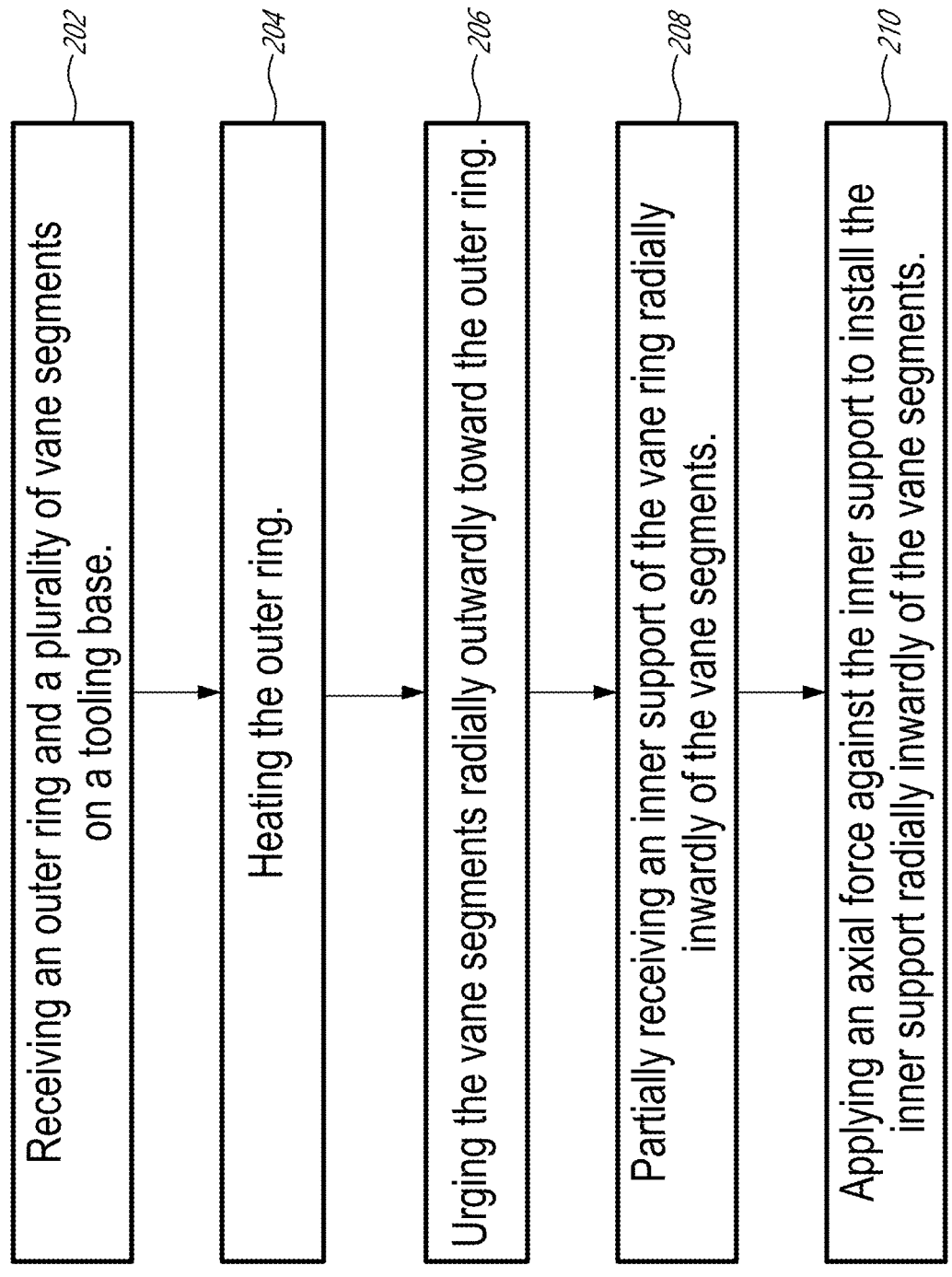
FIG. 14 is a flow diagram of a method of assembling a vane ring of a turbine engine.

FIG. 14 is a flow diagram of method 200 of assembling vane ring 24 of engine 10 or another vane ring. Method 200 may be performed using tool 26 or other tooling. Method 200 may include components of tool 26 and/or of vane ring 24. Method 200 may include other actions including other actions disclosed herein. In various embodiments, method 200 may include:

receiving outer ring 48 and a plurality of vane segments 50 of vane ring 24 on tooling base 28 where vane segments 50 are disposed radially inwardly of outer ring 48 (block 202);

heating outer ring 48 (block 204);

while outer ring 48 is being heated:

urging vane segments 50 radially outwardly toward outer ring 48 (block 206);

partially receiving inner support 54 of vane ring 24 radially inwardly of vane segments 50 (block 208); and applying axial force F1 against inner support 54 to install inner support 54 radially inwardly of vane segments 50 (block 210) and establish a press fit between outer ring 48, vane segments 50 and inner support 54.

In some embodiments, the press fitting aspect of the assembly of vane ring 24 may include the compression of one or more seals 70, 118 between some components of vane ring 24. For example, in some embodiments, inner support 54 may have seal 70 installed thereon and extending around inner support 54. Method 200 may include radially compressing seal 70 between inner support 54 and vane segments 50 during the application of axial force F1 against inner support 54.

In some embodiments, method 200 may include receiving seal 118 between vane segments 50 and outer ring 48. Method 200 may include radially compressing seal 118 between vane segments 50 and outer ring 48. In some embodiments, a radial compressive pre-load may be applied to seal 118 using jaws 32. In some embodiments, further radial compression of seal 118 may be achieved during the application of axial force F1 against inner support 54 and the further insertion of inner support 54 centrally of vane segments 50.

The embodiments described in this document provide non-limiting examples of possible implementations of the present technology. Upon review of the present disclosure, a person of ordinary skill in the art will recognize that changes may be made to the embodiments described herein without departing from the scope of the present technology.

What is claimed is:

1. A tool for assembling a vane ring including an outer ring, an inner support and a plurality of vanes disposed radially between the outer ring and the inner support, the tool comprising:
    a base configured to receive the outer ring and the vanes radially inwardly of the outer ring and angularly distributed about an axis;
    a heater operable to apply heat to the outer ring when the outer ring is received on the base;
    jaws having a plurality of radially actuatable pads operable to urge the vanes radially outwardly toward the outer ring; and
    a press operable to apply an axial force against the inner support to install the inner support radially inwardly of the vanes.

2. The tool as defined in claim 1, wherein the base includes a receptacle configured to receive a boss on a vane segment including one or more of the vanes to angularly locate the vane segment on the base.

3. The tool as defined in claim 2, wherein the receptacle includes a slot extending axially relative to the axis and having an open axial end for receiving the boss therein when the vane segment is received on the base by an axial movement of the vane segment relative to the base.

4. The tool as defined in claim 1, wherein the base includes a locating feature configured to interact with the inner support to angularly locate the inner support on the base.

5. The tool as defined in claim 1, wherein:
    the heater is configured apply heat to the outer ring by conductive heat transfer; and
    the heater extends along a majority of a circumference of the outer ring.

6. The tool as defined in claim 1, wherein:
    the press includes a drift defining an annular interface for applying the axial force against the inner support; and
    the jaws define a central opening that is sized to permit a passage of the drift therethrough.

7. The tool as defined in claim 6, wherein the pads are angularly distributed about the central opening of the jaws.

8. The tool as defined in claim 1, wherein the jaws include:
    a first ring configured to be secured to the base; and
    a second ring coaxial with the first ring and rotatable about the axis when the first ring is secured to the base, the second ring being operatively connected to the pads to actuate the pads.

9. The tool as defined in claim 8, comprising a plurality of cams connected to the second ring of the jaws and rotatable with the second ring, the cams being respectively engaged with follower surfaces of the pads to convert rotary motion of the cams into radially outward motion of the pads.

10. The tool as defined in claim 8, comprising a cam connected to the second ring of the jaws and rotatable with the second ring, the cam being engaged with a follower surface of a first of the pads to convert rotary motion of the cam into radial motion of the first pad.

11. The tool as defined in claim 10, wherein the cam is located radially inwardly of the first pad.

12. The tool as defined in claim 10, wherein the first pad is engaged with the first ring via a guide extending radially relative to the axis.

13. The tool as defined in claim 12, wherein:
    the guide includes a rail secured to the first ring; and
    the guide is slidably received in a slot defined in the first pad.

* * * * *